United States Patent [19]

Gallagher

[11] 4,100,328

[45] Jul. 11, 1978

[54] BINDER COMPOSITION AND PROCESS FOR PREPARING PRESSURE MOLDED CELLULOSIC ARTICLES

[75] Inventor: James A. Gallagher, Grosse Ile, Mich.

[73] Assignee: BASF Wyandotte Corporation, Wyandotte, Mich.

[21] Appl. No.: 695,902

[22] Filed: Jun. 4, 1976

[51] Int. Cl.$^2$ .......................... B32B 5/16; C08L 1/00; B29J 5/04

[52] U.S. Cl. ........................................ 428/407; 260/9; 260/37 N; 264/109; 264/122; 264/115

[58] Field of Search ............... 428/326, 407, 424, 537; 264/109, 122, 115; 260/9, 37 N

[56] References Cited

U.S. PATENT DOCUMENTS

| | | | |
|---|---|---|---|
| 3,016,365 | 1/1962 | Holtschmidt | 260/9 |
| 3,309,444 | 3/1967 | Schneler | 264/109 |
| 3,310,533 | 3/1967 | McElroy | 260/9 |
| 3,418,402 | 12/1968 | Grissom | 264/65 |
| 3,689,442 | 9/1972 | Taub | 260/9 |
| 3,790,421 | 2/1974 | Habgood | 428/326 |
| 3,821,135 | 6/1974 | King | 428/326 |
| 3,870,665 | 3/1975 | Diehr | 156/331 |
| 3,919,017 | 11/1975 | Shoemaker | 156/331 |
| 4,011,183 | 3/1977 | Ruff | 260/9 |

FOREIGN PATENT DOCUMENTS

1,303,516  1/1973  United Kingdom.

*Primary Examiner*—Ellis P. Robinson
*Attorney, Agent, or Firm*—Andrew E. Pierce; Bernhard R. Swick; Robert E. Dunn

[57] ABSTRACT

There is disclosed a polyether polyol-organic polyisocyanate binder for bonding cellulosic materials under conditions of heat and pressure and a process therefor. Sticking to mold faces is eliminated and strong moisture-resistant bonds can be obtained using as starting materials cellulosic materials such as wood chips containing the moisture present under normal manufacturing conditions of temperature and humidity.

15 Claims, No Drawings

BINDER COMPOSITION AND PROCESS FOR PREPARING PRESSURE MOLDED CELLULOSIC ARTICLES

BACKGROUND OF THE INVENTION

1. Field of the Invention

The invention is in the field of adhesives or binders suitable for use under conditions of heat and pressure in binding cellulosic materials and processes for the preparation of molded objects such as wood particle board or other pressed or molded products.

2. Description of the Prior Art

Cellulosic particle board is made by pressing comminuted cellulosic material which can be vegetable fiber such as cornstalks, straw or cellulosic materials derived from trees, i.e., wood pulp, shredded paper or bark. The binders commonly used in producing particle board are thermosetting resins such as urea-formaldehyde resins or other thermosetting resins such as phenol-formaldehyde, resorcinol-formaldehyde and melamine-formaldehyde. The thermosetting resins exemplified by the urea-formaldehyde and phenol-formaldehyde resins are generally used at levels of between 5 and 15% based upon the dry weight of the cellulosic material.

It is known to use organic polyisocyanates as binders in processes for the preparation of wood particle board in which the organic polyisocyanates can be used alone or in combination with formaldehyde. The use of organic polyisocyanates as binders and/or impregnating agents for lignocellulosic materials is disclosed in German Pat. No. 2,109,686, in U.S. Pat. No. 3,870,665 and in U.S. Pat. No. 3,919,017. The limitations of the use of an organic polyisocyanate as a binder for lignocellulosic material are specifically described in U.S. Pat. No. 3,870,665. The known tendency of these resins to stick to metallic molds can be overcome by the incorporation of a catalyst as described which promotes the reaction of NCO groups to form isocyanurate rings. The catalyst need only be incorporated into the mold-release agent which is coated onto the metal parts of the mold used in pressing the lignocellulosic material to overcome sticking to the metallic mold face according to the teaching of this patent.

Combinations of an organic polyisocyanate and formaldehyde are disclosed in U.S. Pat. No. 3,919,017 as binders for cellulosic materials for use in the consolidation of such materials by the use of elevated pressure and temperature conditions. The severe sticking of polyisocyanate adhesives to metal is noted. The proposed solution is to provide a release film or an antistick coating on exposed metal parts.

It is also known to utilize the reaction product of an organic polyisocyanate with a polyether polyol as a binder for polyvinyl chloride foam from British Pat. No. 1,303,516. This reference does not teach such a reaction product as a binder for cellulosic particles in a process for the production of particle board or other heat and pressure molded cellulosic articles.

SUMMARY OF THE INVENTION

It has been found unexpectedly that a binder system for cellulosic, heat and pressure molded, articles such as wood particle board comprising an organic polyisocyanate and a polyether polyol produces equivalent physical properties at a much lower concentration of binder based on the dry weight of the cellulosic particles bound as compared with thermosetting binders of the prior art such as urea-formaldehyde resins. Consolidation of cellulosic particles into a particle board when accomplished using the binder of the invention and metal mold faces takes place with substantially reduced adhesion to metal mold parts as compared to a similar use of prior art binders comprising an organic polyisocyanate. It is thus possible to achieve faster production cycles and thereby effect economies over processes of the prior art in the production of wood particle board when using the binder composition disclosed herein.

It was also unexpected to find that the binder composition disclosed herein can be utilized in combination with cellulosic materials having a moisture content of between about 5 to about 10% and even higher based upon the dry weight of the cellulosic particles utilized. This is because it was believed that the organic polyisocyanate because of its high reactivity with water would preferentially react with the moisture contained in the cellulosic particles and thereby leave the polyether polyol coreactant essentially unreacted.

By the process of the invention it is possible to produce, reliably and economically, a bonded cellulosic particle board which can contain besides binder and cellulosic particles the usual commercial additives to protect the particle board against destruction by fungi, insects or fire.

DESCRIPTION OF THE PREFERRED EMBODIMENTS

The polyisocyanate component of the binder composition of the invention can be any organic polyisocyanate containing at least two active isocyanate groups per molecule, or mixtures of such compounds. These can include aromatic, aliphatic and cycloaliphatic polyisocyanates. Polymethylene polyphenyl isocyanates having the general formula:

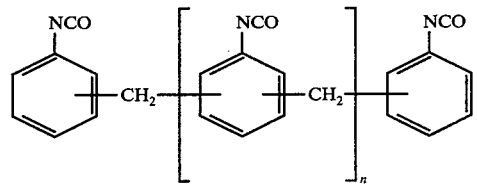

wherein $n$ has an average value of 1 are particularly suitable but other polyisocyanates such as diphenyl methane 4,4'-diisocyanate, m- and p-phenylene diisocyanates, chlorophenylene diisocyanates, toluene di- and triisocyanates, and diphenyl ether 2,4,4'-triisocyanate, m-phenylene diisocyanate, toluene-2,4-diisocyanate, hexamethylene-1,6-diisocyanate, tetramethylene-1,4-diisocyanate, cyclohexane-1,4-diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenyl methane diisocyanate, and the tetraisocyanates such as 4,4'-dimethyldiphenyl methane 2,2',5,5'-tetraisocyanate and mixtures thereof can be used.

Organic polyisocyanates which have been modified with less than equivalent amounts of short-chain diols, triols and other polyhydroxy compounds can also be used as a partial replacement for unmodified polyisocyanates as will be apparent to one skilled in the art. Polyhydroxyl compounds such as propylene glycol, trimethylolpropane, butanediol, glycerol, hexane 1,2,6-triol or adducts thereof with alkylene oxide are suitable for use in preparing such modified polyisocyanates. The procedure for the preparation of these modified polyisocyanates comprises combining the reactants by stirring in the diol, triol or other polyhydroxy compound used in a minor amount into the polyisocyanate. The reactants are then allowed to react under continuous stirring until a temperature of 80° Centigrade is reached. This temperature is maintained for 1 hour and then the reaction mixture is force cooled to 50° Centigrade and transferred to storage containers.

It is to be understood in this specification and claims that the terms "organic polyisocyanate" are defined as including the above described modified polyisocyanates.

Illustrative of the useful organic low molecular weight polyether polyols having hydroxyl numbers of about 30 to about 750 which can be used either individually or in mixtures are those polyether polyols derived from reaction of a polyhydric alcohol having at least three active hydrogen atoms and an alkylene oxide. Determination of hydroxyl number is in accordance with the test method of ASTM D-2849 which is hereby incorporated by reference.

Representative polyhydric alcohols (also referred to as polyols) having a functionality of at least three, i.e., at least three active hydrogen atoms are: 1,1,1-trimethylolpropane, 1,1,1-trimethylolethane, 1,1,1-trimethylolbutane and higher homologs, glycerol, 1,2,3-trihydroxybutane, 1,2,3-trihydroxypentane and higher homologs, 1,2,4-trihydroxybutane, 1,2,6-trihydroxyhexane; (4 hydroxyl groups) erythritol and pentaerythritol; (5 hydroxyl groups) adonitol, arabitol, xylitol; (6 hydroxyl groups) glucosides such as the lower alkyl (1 to 6 carbon atoms) glucosides, for instance, the methyl-D-arabinoside, methyl-D-xyloside, ethyl-D-xyloside, n-butyl-D-riboside, methyl, ethyl, propyl, butyl, and 2-ethylhexyl-D-glycoside, 2-ethylhexyl-D-fructoside, isobutyl-D-mannoside, ethyl-D-galactoside, benzyl-D-glycoside and methyl-L-rhammoside; sucrose; glycose glycoside; maltose; lactose; D-gulose, D-idose, hydroxyethyl cellulose; amylose; amylopectin; dextrin; and the like.

Suitable alkylene oxides which can be used in the preparation of the polyether polyols of the invention include: ethylene oxide, 1,2-propylene oxide, 1,2-butylene oxide, 1,2-hexylene oxide, 1,2-dodecylene oxide, cyclohexylethylene oxide, styrene oxide, and the like alkylene oxides. The particularly preferred alkylene oxide is 1,2-propylene oxide, used alone or in combination with ethylene oxide. Most favorable results are exhibited from the use of such preferred alkylene oxides.

The alkylene oxide adducts of amines are also useful in catalytic amounts to replace a portion of the polyether polyol. Diethanolamine, triethanolamine, diisopropanolamine, triisopropylamine, ethylene diamine, diethylene triamine, and higher homologs, toluene diamine, 4,4'-methylene dianiline, piperazine, 2-methylpiperazine, aniline and combinations of these amines can be reacted with alkylene oxides to prepare useful adducts. Thus mixtures of the alkylene oxide adducts of low molecular weight polyols and catalytic amounts of the alkylene oxide adducts of various amine compounds can be utilized with the aromatic, aliphatic and cycloaliphatic polyisocyanates to prepare the binder compositions of the invention.

The alkylene oxide adducts of the invention can be used in amounts up to about 70 equivalent weight percent in combination with the following diols: ethylene glycol, diethylene glycol, triethylene glycol, and higher homologs, propylene glycol, dipropylene glycol, tripropylene glycol, and higher homologs, 1,2-butylene glycol, 1,3-butylene glycol, 1,4-butane diol, poly(tetramethylene ether) glycols, neopentyl glycol, 1,6-hexane diol, 1,2-hexane diol, 1,4-cyclohexane dimethanol and mixtures thereof.

The term "active hydrogen atoms" refers to hydrogen atoms which, because of their position on the molecule display activity according to the Zerewitinoff test as described by Kohler in *The Journal of the American Chemical Society*, 49, 3181 (1927). The active hydrogen atoms can be attached to oxygen, nitrogen or sulphur atoms.

The polyalkylene polyether polyols useful as binder components of the invention are preferably prepared from alkylene oxides having from 2 to about 6 carbon atoms and can be prepared by known processes, for example, that disclosed by Wurtz in 1859 and that disclosed in *The Encyclopedia of Chemical Technology*, Volume 7, pages 257–262, Interscience Publishers Incorporated, (1951) or that disclosed in U.S. Pat. No. 1,922,459.

It has now been found that the use of the organic polyisocyanate binder component in admixture with a polyether polyol having a functionality greater than two, as previously described, provides a binder composition which when utilized generally in the proportion of about 0.5 to about 50% based on the dry weight of the cellulosic material to be formed, for instance, into a particle board, results in a composition which, during the process of preparation, can be made without encountering the usual and ordinary sticking of an isocyanate-type binder to the metal mold faces utilized in the pressing equipment. This is particularly unexpected in view of the fact that this has been a long standing problem with isocyanates as shown in prior art processes involving the use of polyisocyanates as adhesives, binders, or impregnating agents. In the process of the invention, the mold-release agents utilized in the molding processes of the prior art involving isocyanate-type binders or alternately the use of special catalysts contained in the mold-release agent or the use of release papers have been found to be unnecessary for the production of the particle board of the invention provided the organic polyisocyanate binder component is used in combination with an organic polyether polyol as previously described. For best results, it is generally desirable to use a stoichiometric amount of the polyether polyol based on the amount of organic polyisocyanate used. Generally, a proportion of about 0.5 to about 1.0 equivalent weight of the polyol of the invention can be utilized based upon one equivalent weight of the organic polyisocyanate. Preferably, about 0.8 to about 1.0 equivalent weight of a polyether polyol of the invention is utilized and most preferably about 0.9 to about 1.0 equivalent weight.

As will be understood, the novel organic polyisocyanate-polyether polyol binder system of the invention can be used in manufacturing a wide variety of molded products from a similarly wide variety of cellulosic materials either used individually or in mixtures. Non-cellulosic materials such as sand or plastic scrap can also be consolidated in a similar manner; the selection of such materials being based primarily upon economic factors. The invention is described below particularly with respect to the manufacture of so-called wood particle boards which are generally based upon the use of wood chips such as planer shavings and veneer chips including bark and sawdust and, therefore, the proportions set forth in this description of the invention are designed to provide a suitable binder amount for bonding relatively coarse particles of wood or other cellulosic material using heat and pressure. Where it is envisioned to use a more finely comminuted cellulosic material having a greater surface area for forming the molded objects of the invention, the binder proportions must be accordingly increased in order to provide a suitable proportion of binder so as to insure that the binder functions as a substantially continuous coating on the particles to be bound.

The particle board of the invention can be fabricated according to known processes utilizing the application of heat and pressure subsequent to spraying the particles with the binder composition of the invention as the particles are tumbled or agitated in a blending machine. Upon completion of the blending operation and the production of a uniform mixture of coated cellulosic particles and binder, the blended material is formed into a loose mat or felt which can contain relatively large amounts of moisture without having a deleterious effect on the finished product. The mat is then placed in a heated press between polished metal plates. As previously described, it is unnecessary in the process of the invention that these metal plates used against the particle board be treated with an anti-stick composition or so-called mold-release agent since it has been found that the binder composition of the invention when utilized in the proportions previously stated can be removed easily from the press without sticking to the metal plates.

The moisture content of wood particles used in the preparation of particle board generally can be from about 2 to about 20% by weight based upon the dry weight of the cellulosic material used. By the process of the invention it is possible to obtain economies in the preparation of particle board since the particles to be utilized in the preparation of particle board need not be dried to a moisture content of about 2–5% as is required where urea-formaldehyde resins are utilized as binders.

Generally, about 0.5 to about 50% of binder is used in the process of the invention based upon the dry weight of the cellulosic particles to be bound. Preferably about 0.5 to about 10% binder and most preferably about 0.5 to about 3% binder is used, the higher levels of binder provide better physical properties, particularly improved resistance to degradation upon exposure of the particle board to water or steam.

Pressing time and pressure to produce a particle board from binder-coated cellulose mat can vary widely depending on the thickness of the board to be produced and the desired density of the board as well as the size of the particles used to form the board. In the laboratory, it has been found that to prepare a ¼ to ½ inch thick particle board of medium density approximating the usual density commercially produced using a urea-formaldehyde binder that pressures of about 300 to about 350 pounds per square inch at board temperatures of about 160° to about 190° C. are required. Under these conditions, a pressing time between about 2 to about 10 minutes is necessary to achieve proper cure of the binder composition of the invention.

Comparative testing of a commercial particle board produced using a conventional urea-formaldehyde binder in comparison with particle board produced using the novel binder system of the invention indicates that the strength properties of the resultant particle board produced by the process of the invention is at least equal to that of the commercial urea-formaldehyde bound particle board even at a binder level of 1.5% of the binder of the invention.

Particle board was produced as indicated in the following examples using a procedure generally as follows: The binder is coated onto the wood chips by placing gallon paint cans charged with 300 grams of chips together with a freshly mixed portion of binder which is poured directly onto the chips. Eight ½ inch ceramic balls are then added to the can and the lid placed on the can and whole mass shaken on a paint shaker for 5 minutes. A Carver laboratory press was utilized to prepare the pressed particle board and two 6-inch by 12-inch pieces of ½-inch aluminum plate were used as bottom and top mold face plates against which the mixture of binder and chips is pressed. For preparation of ½-inch boards a 600-gram charge of chips and an appropriate amount of binder is charged into the gallon paint cans. Generally, a platen pressure of between 1,000 and 2,000 pounds per square inch was used at a temperature of about 125° to about 150° C. over a time of about 10 minutes. The particle board actually was not exposed to this temperature for this time because about seven minutes are required for the chips to reach 140° C. when the temperature of the platen is 150° C. and ½-inch plates are used.

The following examples are meant to be illustrative and not limiting and are given to describe further the use of the novel binder compositions of the invention. In the specification, claims and the examples which follow, all proportions are by weight and all temperatures are in degrees Centigrade unless otherwise noted.

EXAMPLE 1

A particle board panel was prepared as follows from aspen shavings which have been further comminuted to an average particle size of ¾ inch by ¼ inch by 1/16 inch. The organic polyisocyanate component of the binder consists of polymethylene polyphenyl isocyanate having an NCO content of 31 to 32% and an equivalent weight of 132.

The second component of the binder was a high functionality polyoxypropylene glycol having an hydroxyl number of 397, a functionality greater than two and an average molecular weight of 425, prepared by reacting trimethylolpropane with propylene oxide and sold under the registered trademark "PLURACOL" by BASF Wyandotte Corporation. The binder was prepared by combining these components in a stoichiometric proportion and 4.5 grams of binder were applied to 300 grams of wood chips by mixing 10 minutes on a paint shaker. The mixture as poured onto an aluminum plate using cardboard dams on all four sides of the aluminum plate to contain the wood chip-binder mixture. A second aluminum plate was placed on top of the wood chips and the sandwich was placed in a Carver laboratory press with platens heated to a temperature of 125° C. on the top part and 150° C. on the bottom. After pressing at a pressure of 500 pounds per square inch for 10 minutes (gauge) physical tests were performed on the ½ inch particle board produced. The test results are tabulated in the following table.

TABLE

| Example No. | Binder, % on Dry Weight of Wood Chips | Pressing Conditions (psig) | (° C.) | (minutes) | Density, lb/ft³ | Physical Properties ½ Inch Particle Board Flexural Strength (psi) Dry | Wet | Screw Withdrawal Strength (psi) | Internal Bond Strength (psi) |
|---|---|---|---|---|---|---|---|---|---|
| 1 | 1.5 | 500 | 125-150 | 10 | 36.7 | 659 | 134 | 97 | 27 |
| 2 | 1.5 | 1000 | 125-150 | 10 | 46.8 | 2368 | 409 | 233 | 63 |
| 3 | 1.5 | 1500 | 125-150 | 10 | 47.5 | 2972 | 232 | 355 | 57 |
| 4 | 1.5 | 1500 | 125-150 | 10 | 60.0 | 3339 | 1391 | 408 | 135 |
| Control - Commercial Board with 8% Urea-Formaldehyde Binder | | | | | 42.1 | 2440 | 1288 | 290 | 115 |

EXAMPLE 2

Following the procedure of Example 1, a particle board was prepared using a stoichiometric amount of a polymethylene polyphenyl isocyanate having a functionality of 2.6 in combination with a polyoxypropylated pentaerythritol polyether polyol having an hydroxyl number of 555, an average molecular weight of 405 and a functionality greater than two. The procedure for preparation of the particle board, conditions of heat, pressure and time are tabulated in the table together with the physical properties of the ½-inch thickness particle board prepared.

EXAMPLE 3

Using a stoichiometric porportion of the organic polyisocyanate of Example 2 in combination with a polyoxypropylated pentaerythritol polyether polyol of 594 average molecular weight having an hydroxyl number of 378, a functionality greater than three, a wood particle board was prepared. The procedure for preparation of the particle board, conditions of heat, pressure and time are tabulated in the table together with the physical properties of the ½-inch thickness particle board prepared.

EXAMPLE 4

Following the procedure of Example 1 a particle board was prepared using as binder an organic polyisocyanate which is a polymethylene diisocyanate having a functionality of 2.6, an equivalent weight of 132 to 135 and an NCO content of 31-32%.

In combination with the organic polyisocyanate there was used an oxyethylated pentaerythritol based polyether polyol having an hydroxyl number of 450, a molecular weight of 594 and a functionality of four. The conditions of pressure, temperature and time used in the preparation of the particle board of Example 4 and the physical properties obtained upon testing the resulting particle board are tabulated in the table.

EXAMPLE 5

Following the procedure of Example 1, particle board is prepared using as a binder toluene diisocyanate with a stoichiometric amount of polyoxyalkylated glycerol. A particle board is obtained which, during preparation, is free of a tendency to stick to the aluminum plates which are utilized as mold faces to prepare said particle board.

The table also contains a control sample forming no part of this invention which is identified as a commercial particle board made using a urea-formaldehyde binder at a level of 8% binder based upon the dry weight of the wood chips. It will be noted that the various particle boards prepared in Examples 1 through 4 exhibit properties comparable in many respects to the commercial board properties which are listed and that in Example 4 the physical properties of the particle board substantially exceed those of the commercial particle board in every physical property test performed. In the table, the marked improvement of Example 4 over Example 3 with respect to the wet flexural strength can be attributed to the fact that the composition of Example 4 utilizes a low molecular weight polyether having a functionality of four, thus providing a more tightly crosslinked binder matrix.

Procedures used for determining density, flexural strength, screw withdrawal strength and internal bond strength are contained in Department of Commerce, Commercial Standard CS 236-66 entitled *Mat-Formed Wood Particle Board*, which is hereby incorporated by reference.

The foregoing examples and methods have been described for the purpose of illustration and are not to be construed as indicating any limitation in the novel binder composition of the invention or in the process for producing a molded cellulosic material such as a particle board. Many modifications and ramifications will naturally suggest themselves to those skilled in the art based upon this disclosure. These modifications and ramifications are intended to be comprehended as within the scope of this invention.

The embodiments of the invention in which an exclusive property or privilege is claimed are defined as follows:

1. A molding composition suitable for forming a shaped article comprising wood particles having about 2 to about 20% by weight moisture based upon the dry weight of said wood particles and a binder composition capable of being crosslinked coated onto said wood particles and present in the proportion of about 0.5 to about 50% based upon the dry weight of said wood particles, said binder consisting essentially of the mixture of an organic polyisocyanate and 0.5 to about one equivalent weight of a polyether polyol based upon one equivalent weight of said organic polyisocyanate, said polyol having a functionality greater than 2 wherein said molding composition contains no catalyst and is used in the absence of a mold-release agent.

2. The product of claim 1 wherein said polyether polyol is the adduct of a polyhydric alcohol and an alkylene oxide.

3. The product of claim 2 wherein said binder comprises (1) the polyether polyol adduct of a polyhydric alcohol having a functionality of at least three and an alkylene oxide and (2) a diol.

4. The product of claim 2 wherein said polyhydric alcohol is selected from the group consisting of trimethylolpropane, pentaerythritol, glycerol, and sorbitol.

5. The product of claim 4 wherein said alkylene oxide is selected from the group consisting of ethylene oxide, 1,2-propylene oxide and mixtures thereof.

6. The product of claim 5 wherein said organic polyisocyanate is polymethylene polyphenyl isocyanate and wherein said polyether polyol is a polyoxypropylated trimethylolpropane.

7. The product of claim 5 wherein said organic polyisocyanate is polymethylene diisocyanate and said polyol is a polyoxypropylated pentaerythritol.

8. A particle board comprising comminuted wood particles, said particles having about 2 to 20% by weight moisture based upon the dry weight of said wood particles, and a binder coated onto said particles present in the proportion of about 0.5 to about 50% based upon the dry weight of said particles, said binder consisting essentially of the crosslinked reaction product of an organic polyisocyanate and 0.5 to about one equivalent weight of a polyether polyol based upon one equivalent weight of said organic polyisocyanate, said polyether polyol having a functionality greater than 2 and wherein said binder is utilized in the absence of a catalyst and a mold-release agent.

9. The particle board of claim 8 wherein said binder comprises an organic polyisocyanate and a polyether polyol selected from the group consisting of a polyoxyalkylated trimethylolpropane, a polyoxyalkylated pentaerythritol and polyoxyalkylated glycerol.

10. The particle board of claim 9 wherein said organic polyisocyanate is selected from the group consisting of polymethylene diisocyanate, polymethylene polyphenyl isocyanate and toluene diisocyanate.

11. The particle board of claim 10 wherein said binder contains a stoichiometric amount of said polyether polyol based upon said organic polyisocyanate.

12. The particle board of claim 11 wherein said binder comprises a mixture of a polymethylene diisocyanate and a polyoxyalkylated pentaerythritol.

13. A process for molding wood particles into a discrete shaped product utilizing a binder in the absence of a catalyst and a mold-release agent comprising:

A. comminuting wood having about 2 to about 20% by weight moisture based upon the dry weight of said wood to provide a plurality of wood particles, B. coating said particles with a binder mixture, said binder consisting essentially of an organic polyisocyanate having at least two active isocyanate groups per molecule and about 0.5 to about 1.0 equivalent weight of a polyether polyol based upon one equivalent weight of said organic polyisocyanate wherein said polyol is prepared by reacting a polyhydric alcohol having a functionality greater than 2 with an alkylene oxide and wherein said wood particles are coated with said binder in the proportion of about 0.5 to about 50% based upon the dry weight of said wood particles to form a blended material by spraying with said binder as said particles are tumbled or agitated, C. forming said blended material into a loose mat or felt, D. placing said mat in a heated press between polished metal plates, and E. crosslinking said mat under conditions of heat and pressure.

14. The process of claim 13 wherein said organic polyisocyanate is polymethylene polyphenyl isocyanate and wherein said polyol is a polyoxypropylated trimethylolpropane.

15. The process of claim 14 wherein said binder is a mixture of polymethylene polyphenyl isocyanate and polyoxypropylated pentaerythritol.

* * * * *